July 12, 1960     C. D. STRANG     2,945,138
FLYWHEEL ALTERNATOR FOR AN INTERNAL-COMBUSTION ENGINE
Filed Jan. 2, 1958
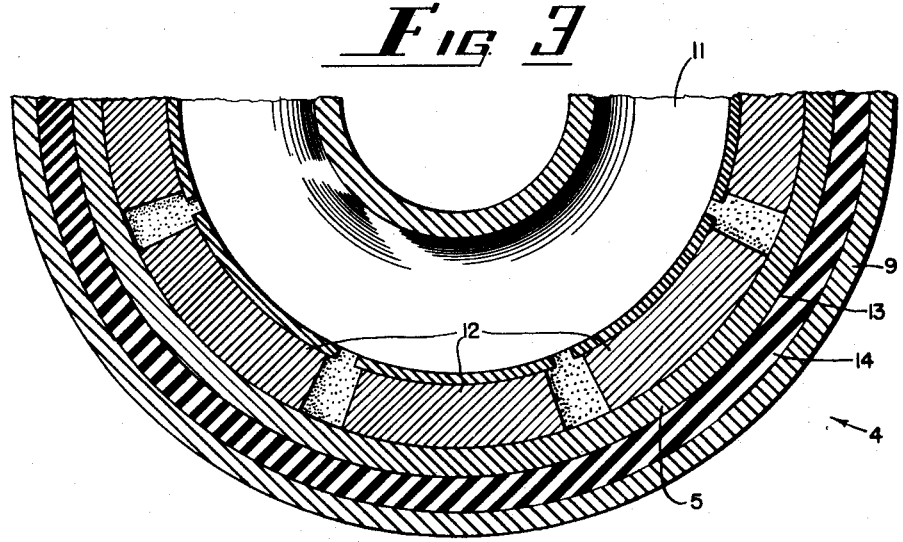
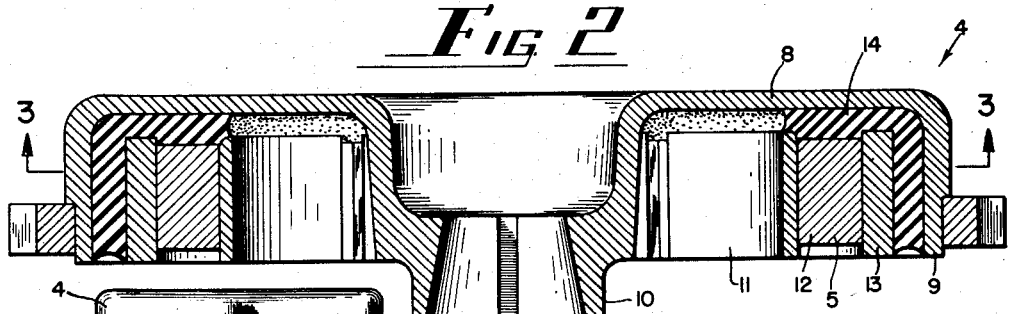
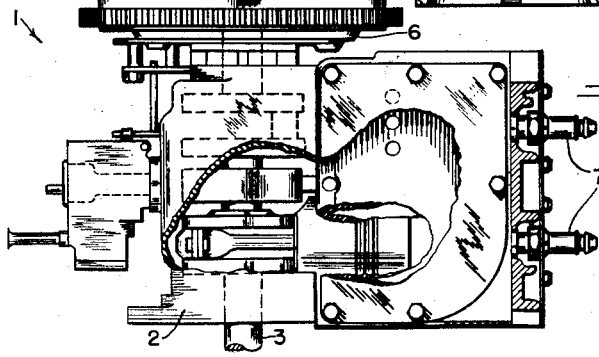
INVENTOR.
CHARLES D. STRANG
BY
*Andrus, Scales & Starke*
ATTORNEYS

United States Patent Office 2,945,138
Patented July 12, 1960

2,945,138

FLYWHEEL ALTERNATOR FOR AN INTERNAL-COMBUSTION ENGINE

Charles D. Strang, Oshkosh, Wis., assignor to Kiekhaefer Corporation, Cedarburg, Wis., a corporation of Wisconsin Filed Jan. 2, 1958, Ser. No. 706,755

3 Claims. (Cl. 310—153)

This invention relates to a flywheel alternator for an internal-combustion engine and more particularly to the mounting of the alternator field magnet assembly to the flywheel.

In the operation of an engine, the flywheel carried by the crankshaft receives power from the shaft during the power strokes of the pistons in the respective cylinders. During the compression strokes of the respective pistons the flywheel delivers power to the shaft. These alternations of power give rise to torsional and other noise producing vibrations which are preferably absorbed or dampened.

One common means for damping these vibrations provides that a separate disc be affixed to the shaft which carries an annular rubber isolated mass. In this instance the rubber serves to permit limited relative movement between the isolated mass and the disc to dampen the vibrations in the shaft and flywheel resulting from the power alternations. While this means has proven satisfactory, it does require a crankshaft which is adapted to accommodate the damper. However, in outboard motors or the like, it is generally not convenient or practical to affix such separate damping means onto the crankshaft. It is an object of this invention, therefore, to provide a flywheel alternator mounting which serves to dampen or absorb the vibrations resulting from power alternations.

In carrying out the invention, the engine shaft of an internal-combustion engine carries a flywheel comprising generally a disc portion having an axially extending peripheral portion which together with the engine shaft defines an annular recess adapted to receive the components of a flywheel alternator or magneto. The alternator components include a plurality of magnets secured in angularly spaced relation to an annular mounting ring to form an integral magnet rotor assembly. The magnet rotor assembly is disposed in the flywheel recess and is spaced respectively from the flywheel disc portion and peripheral portion. A layer of elastic deformable material is interposed between and joins the flywheel portions and magnet rotor assembly and in operation of the engine permits the magnet rotor assembly limited movement relative to the flywheel and crankshaft to dampen vibrations set up therein.

The drawings furnished herewith illustrate the best mode of carrying out the invention as presently contemplated and set forth hereinafter.

In the drawings:

Figure 1 is a side elevation with parts broken away and sectioned of an internal-combustion engine which includes the flywheel alternator structure of this invention;

Fig. 2 is a sectional view of a flywheel showing the alternator magnet assembly mounted in accordance with this invention; and Fig. 3 is a partial sectional view taken on line 3—3 of Fig. 2.

Referring to the drawings, the engine 1 includes a crankcase 2 wherein a crankshaft 3 is rotatably disposed. The crankshaft extends through opposed walls of the crankcase and carries a flywheel 4 at one extremity thereof. A magnet rotor assembly 5 is carried by the flywheel 4 and rotates relative to an armature base or stator plate assembly 6 to generate electrical energy for transmission to the spark plugs 7 for ignition.

As shown best in Fig. 2, the flywheel 4 comprises a disc portion 8 and an integral axially extending peripheral portion 9. Centrally of disc portion 8 the flywheel is provided with a hub 10 having a tapered opening adapted to receive the end of crankshaft 3, and means such as a key, not shown, secures the shaft and flywheel against movement relative to each other. In their assembled relation, the downwardly opening annular recess 11 formed between the hub 10 and the peripheral portion 9 of flywheel 4 is adapted to receive the stationary and rotating components of the flywheel alternator or magneto.

The flywheel alternator includes the magnet rotor assembly 5 which comprises a plurality of spaced permanent magnets 12 secured to the inner periphery of the annular mounting ring 13. The rotor assembly 5 is disposed in annular recess 11 in spaced relation from disc portion 8 of flywheel 4 and is spaced radially inwardly from the peripheral portion 9. A layer 14 of molded resilient material such as rubber having a generally L-shaped cross section is disposed between the rotor assembly and flywheel portions 8 and 9 and joins the rotor assembly to the flywheel for rotation therewith. Joined to the flywheel 4 by means of the resilient layer 14 the relatively heavy magnet rotor assembly 5 serves as an inertia member or vibrating mass of a torsional vibration damper which can oscillate torsionally relative to the flywheel during operation of the engine.

The invention thus provides a flywheel alternator or magneto structure which generates the electrical energy for engine ignition and also serves to dampen or absorb the torsional or noise producing vibrations of the shaft and flywheel during operation of the engine.

Various modes of carrying out the invention are contemplated as being within the scope of the following claims particularly pointing out and distinctly claiming the subject matter which is regarded as the invention.

I claim:

1. In an internal-combustion engine having a crankshaft and flywheel carried by said shaft, a flywheel alternator associated with said flywheel and adapted to generate the electrical energy for engine ignition and including a magnet rotor assembly, and resilient means connecting the rotor assembly to the flywheel, said rotor assembly being adapted to serve as an inertia member and oscillate relative to the flywheel during operation of the engine to dampen torsional vibrations set up in the crankshaft.

2. In an internal-combustion engine having a crankshaft and a flywheel carried by said shaft wherein during operation of the engine the flywheel receives power from the shaft and delivers power to the shaft alternately giving rise to torsional vibrations in the shaft, a flywheel alternator associated with said flywheel and adapted to generate the electrical energy for engine ignition and including a magnet rotor assembly, and a layer of rubber disposed between and connecting the rotor assembly and flywheel, said layer of rubber serving to provide for oscillation of the rotor assembly relative to the flywheel and the rotor assembly serving as a vibrating mass to dampen the torsional vibrations set up in the crankshaft.

3. In an internal-combustion engine having a crankshaft, a flywheel mounted on said shaft and rotatable therewith and comprising a disc portion and an axially extending annular peripheral portion integral with said disc portion, said flywheel together with said crankshaft forming an annular recess, a flywheel alternator disposed in said recess and adapted to generate the electrical energy for engine ignition and including a magnet rotor assembly spaced respectively from the disc portion and peripheral portion of said flywheel, and a layer of rubber having a generally L-shaped cross section molded between the rotor assembly and the disc portion and the peripheral portion respectively of the flywheel, said layer of molded rubber serving to provide for oscillation of the rotor assembly relative to the flywheel and the rotor assembly serving as a vibrating mass to dampen the torsional vibrations set up in the crankshaft.

References Cited in the file of this patent

UNITED STATES PATENTS

| | | |
|---|---|---|
| 1,480,553 | Hoff | Jan. 15, 1924 |
| 2,207,251 | Guedon | July 9, 1940 |

FOREIGN PATENTS

| | | |
|---|---|---|
| 400,957 | Great Britain | Nov. 2, 1933 |
| 32,807 | Netherlands | May 15, 1934 |